United States Patent [19]

Thulin

[11] Patent Number: 4,688,706
[45] Date of Patent: Aug. 25, 1987

[54] DEVICE FOR CARRYING A LOAD

[75] Inventor: Willis Thulin, Hillerstorp, Sweden

[73] Assignee: Industri AB Thule, Sweden

[21] Appl. No.: 770,670

[22] Filed: Aug. 29, 1985

[51] Int. Cl.$^4$ .............................................. B60R 9/00
[52] U.S. Cl. ................................... 224/329; 224/320; 224/322
[58] Field of Search .............. 224/329, 331, 314, 321, 224/320, 322

[56] References Cited

U.S. PATENT DOCUMENTS

| 2,983,414 | 6/1961 | Fehr. |
|---|---|---|
| 3,153,501 | 1/1964 | Binding. |
| 3,385,488 | 4/1968 | Bronson. |
| 3,495,750 | 2/1970 | Oliveira. |
| 3,702,167 | 12/1972 | Olson. |
| 4,230,248 | 5/1980 | Finnegan. |
| 4,326,747 | 6/1982 | Finnegan. |
| 4,354,625 | 7/1982 | Peoples. |
| 4,449,656 | 8/1984 | Wouden. |
| 4,496,089 | 1/1985 | Eklund .............................. 224/329 |
| 4,586,638 | 5/1986 | Prescott et al. .................. 224/329 |

FOREIGN PATENT DOCUMENTS

| 730994 | 3/1966 | Canada ............................... 224/331 |
|---|---|---|
| 73853 | 10/1944 | Czechoslovakia ................ 224/329 |
| 0037456 | 2/1981 | European Pat. Off. . |
| 0105849 | 7/1984 | European Pat. Off. . |
| 0152607 | 12/1984 | European Pat. Off. . |
| 2950449 | 6/1981 | Fed. Rep. of Germany ...... 224/320 |
| 3033903 | 11/1982 | Fed. Rep. of Germany . |
| 370044 | 7/1983 | Fed. Rep. of Germany . |
| 3406149 | 4/1985 | Fed. Rep. of Germany . |
| 2397956 | 3/1979 | France .............................. 224/331 |
| 2506697 | 12/1982 | France . |
| 2559110 | 6/1985 | France . |
| 854638 | 2/1957 | United Kingdom . |
| 2069433 | 1/1981 | United Kingdom . |

Primary Examiner—Stephen Marcus
Assistant Examiner—Robert M. Petrik
Attorney, Agent, or Firm—Burns, Doane, Swecker & Mathis

[57] ABSTRACT

The present invention relates to a structural arrangement by which a load may be carried on the rooftop of a vehicle. A roof rack is provided for directly supporting the load and is detachably connected to the roof of the vehicle through a fastening arrangement. The fastening arrangement will position the roof rack in a predetermined relationship with respect to the vehicle roof and clamp the roof rack thereto. Additionally, the roof rack is correctly positioned and clamped by the same device that connects the roof rack to the vehicle roof.

23 Claims, 9 Drawing Figures

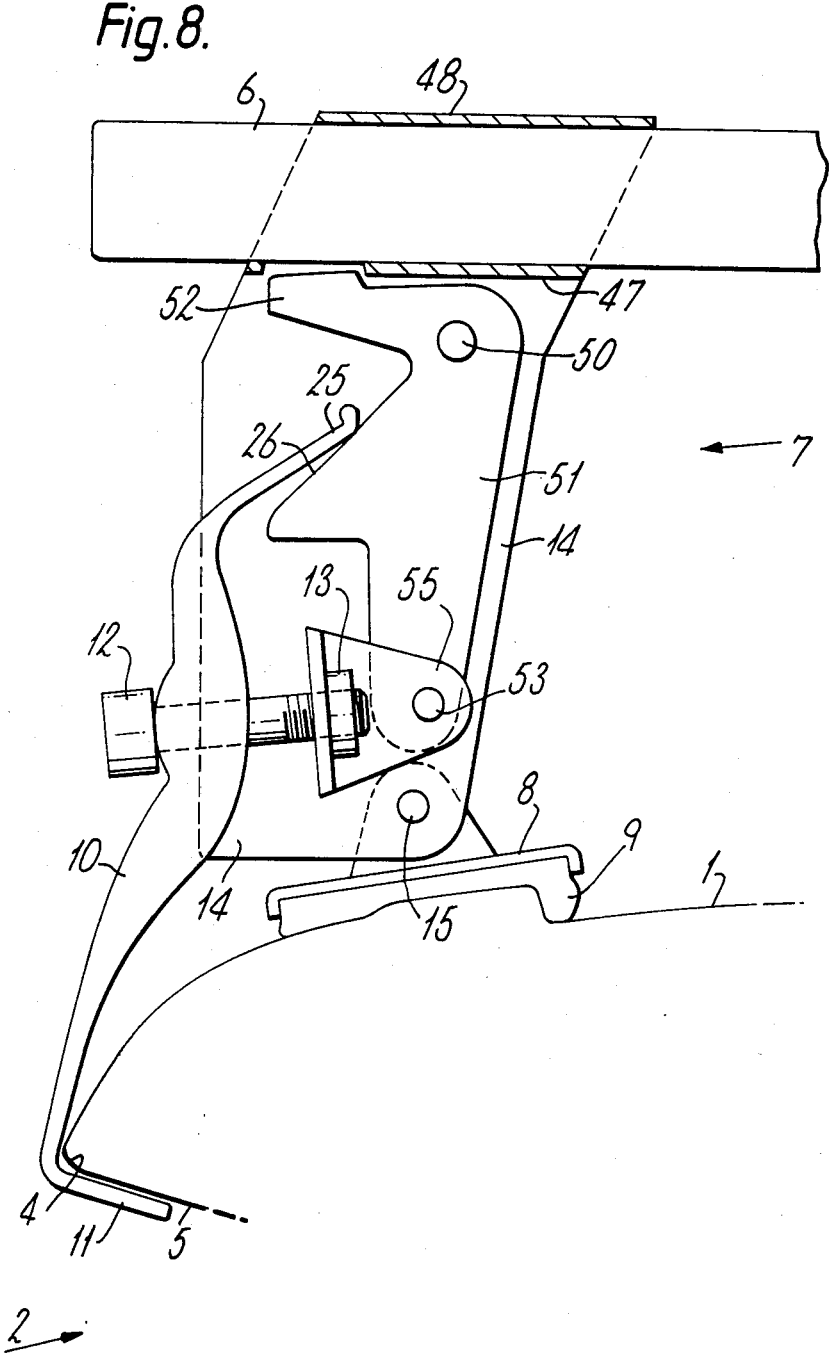

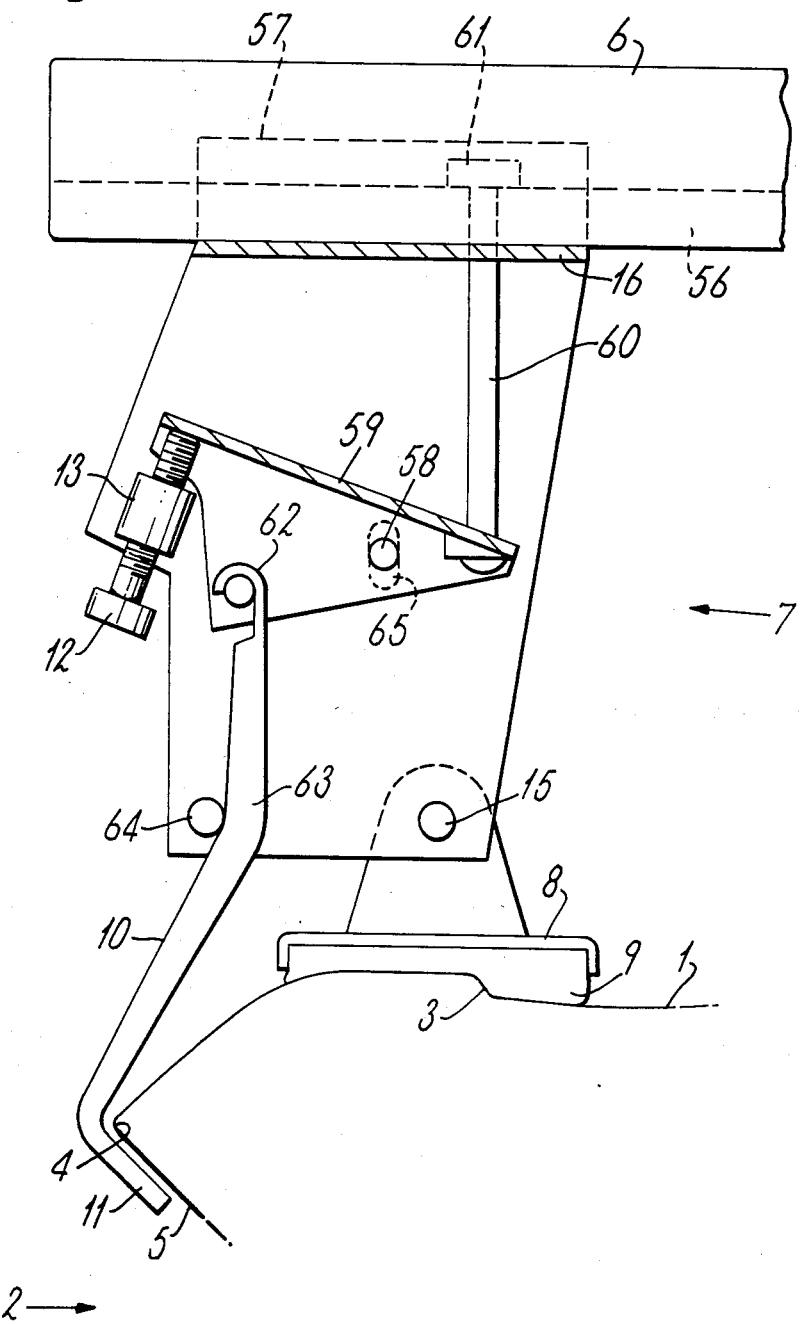

DEVICE FOR CARRYING A LOAD

TECHNICAL FIELD

The present invention relates to a device for carrying a load on a vehicle, preferably a so called load carrier or a roof-rack, which comprises a loading member extending above the roof of the vehicle and adapted to cooperate with the load, and fixing devices at opposite edge portions of the vehicle roof for correctly positioning the loading member in relation to the vehicle roof, each fixing device having engagement means which can be brought into engaging positions while cooperating with the vehicle to obtain the correct position, and connecting means which can be brought into connecting positions while cooperating with said loading member to obtain the correct position.

PRIOR ART

Load carriers of the type mentioned above are previously known in many different designs where the loading member often is in the form of a round or square tube accommodated in corresponding sleaves in the upper ends of the fixing devices. Since one and the same load carrier should be usable on many different type of vehicles, it is readily understood that the distance between the two fixing devices at the ends of the loading member must be accurately adjustable. Further, in order to make the load carrier sufficiently reliable, the fixing devices must be efficiently connected to the transverse loading member in order to prevent any shifting or displacement thereof.

In newer types of vehicles which often lack the old roof moulding or channel, the requirement for a reliable connection between the fixing devices and the loading member is still more important since the engagement means of the fixing devices, which cooperate with the vehicle body to secure the entire fixing device, have more difficulty in efficiently locking the load carrier in the transverse direction of the vehicle.

In prior art constructions, the transverse loading member is, as mentioned above, in general accommodated in corresponding sleaves in the upper ends of the fixing devices. In these older constructions, the interconnection between the loading member and the fixing devices has unexceptionally been affected by means of a screw assembly, which means that the user of the load carrier has run the risk of forgetting to tighten the screws securing the fixing devices to the loading member. The consequences of such inadvertence are obvious.

A further risk of the construction previously used is that vibrations from the vehicle or the load resting on the load carrier have caused said screw assemblies to loosen so that the loading member has been laterally displaced during travel of the vehicle.

OBJECTS OF INVENTION

The present invention has for its object to provide a device of the type mentioned by way of introduction, which has such a design that it will offer an absolutely reliable interconnection between the loading member and the two fixing devices.

A further object of the invention is to provide a device of the type mentioned by way of introduction which dispenses with the need of special manual operations or measures for interconnecting the fixing devices and the loading member when the load carrier is mounted on a vehicle. More precisely, the invention also has for its object to provide such a device which permits simultanious interconnection of the fixing devices and the loading member, on the one hand, and fixing of the fixing devices on the vehicle, on the other hand. Finally, yet another object of the invention is to provide such a device which completely eliminates the risk of a desengagement between the loading member and the fixing devices on account of vibrations, incorrect mounting or the like.

INVENTIVE CONCEPT

The above mentioned objects of the invention are achieved by means of the device described by way of introduction, which is characterized in that the engagement means and connecting means are connected to a common operating device by means of which they can be brought into their engaging and connecting positions, respectively, by actuation of the operating device.

According to the invention, each fixing device suitably also has a supporting member for the loading member, and the connecting means is designed as a pressure member which, by engaging the loading member, is adapted to correctly position the latter against the supporting member, said pressure member being connected to said operating device to be actuated thereby.

In one embodiment of the invention, the supporting member is disposed underneath the loading member, and the pressure member is in the form of a U-shaped member which receives the loading member and which has a pressure surface located above said loading member to urge the latter downwardly into the correct position against said supporting member.

In another embodiment of the invention, the supporting member is suitably located above the loading member on a portion of the fixing device, and the pressure member is provided on an arm which is mounted in the fixing device and which, when actuated by the operating device, is pivotal so as to urge the loading member against the supporting member.

Further features and advantages of the invention will appear from claims 4 and 6–8.

BRIEF DESCRIPTION OF DRAWINGS

The invention will now be described in greater detail with reference to the accompaning drawings, in which:

FIG. 8 in a view corresponding to FIG. 1, shows an eight embodiment of the invention; and FIG. 9 in a view corresponding to FIG. 1, shows a ninth embodiment of the invention.

PREFERRED EMBODIMENT

Figure 1:
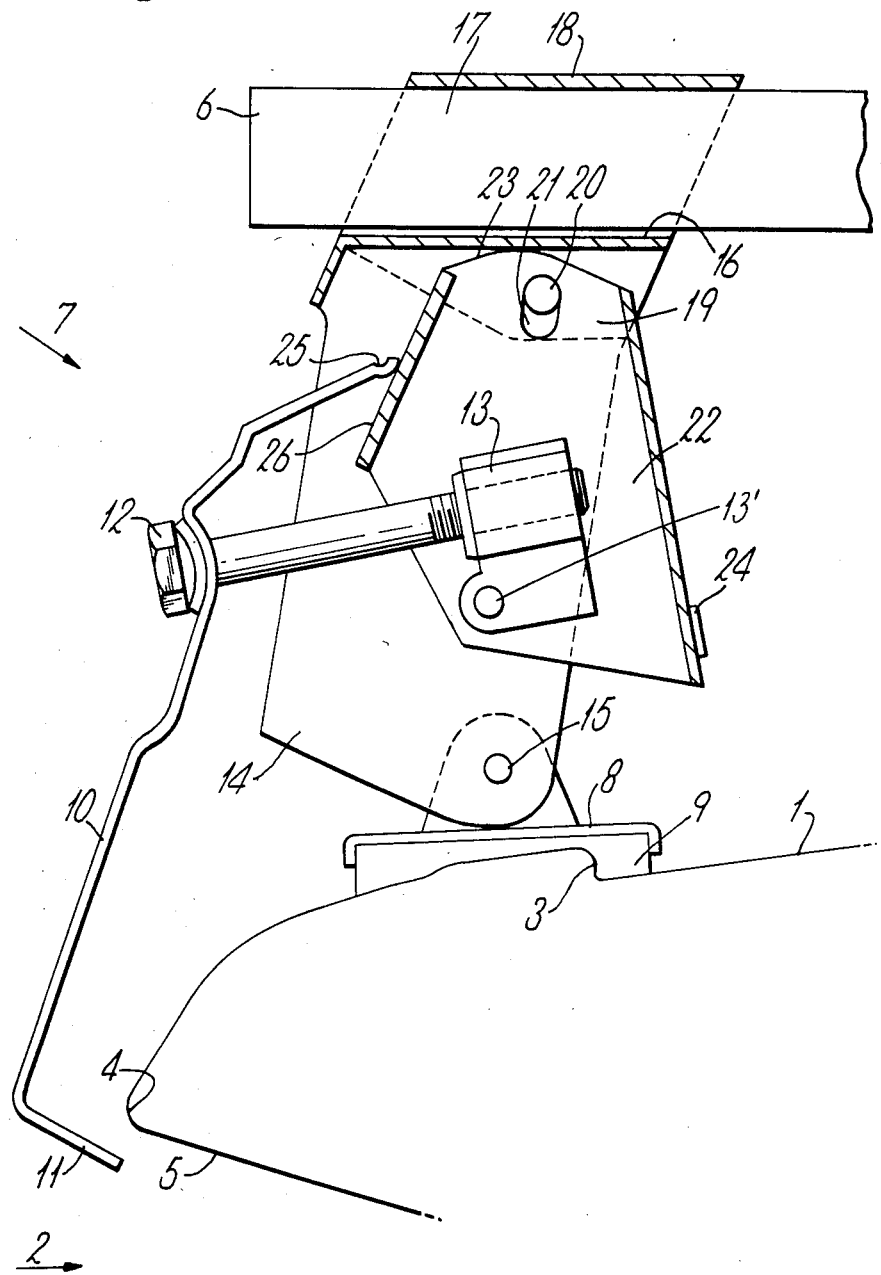
FIG. 1 is a vertical cross section of an end portion of a loading member as well as a fixing device cooperating therewith, and an upper side edge portion of a vehicle roof.

In FIG. 1, reference numeral 1 designates a vehicle roof and 2 an opening for the vehicle door in the side of the vehicle. The vehicle is of a modern type and therefore lacks the old roof moulding or channel extending along the longitudinal edges of the vehicle roof. In order to stiffen the roof but also to permit mounting certain additional equipment, the vehicle roof has a longitudinal shoulder or a corresponding longitudinal raised strip 3 from which the side edge of the roof slopes gently downwardly towards the opening for the vehicle door so as to form a corner region 4 merging into an upper boundary surface 5 upwardly defining the vehicle door opening 2.

In a vehicle where the roof has the design described above, it is only the shoulder or the longitudinal strip 3, the corner region 4 and the upper boundary surface 5 that can normally be used for fixing a roof loadcarrier. The only exception of course is in cases where the vehicle is provided with factory-mounted special holders.

The load carrier proper comprises a loading member 6 which in this embodiment is in the form of a tube, preferably of rectangular cross-section. At either end portion, the loading member has a fixing device 7 which is used for mounting the loading member at opposite edge portions of the vehicle roof, such that the loading member will be located at a certain distance above the vehicle roof with its longitudinal direction transversely of the direction of travel of the vehicle. Each fixing device 7 has a lower engagement member 8 or a foot with an exchangeable insert 9 of a medium hard or elastic material which is so designed as to mate with the design of the roof 1 in the area of the shoulder 3 or the strip. The fixing device 7 further comprises a second engagement member 10 which is designed for seizing about the corner region 4 of the roof and for engaging the upper boundary surface 5 of the vehicle door opening 2 by means of a hook portion 11. Upon tightening of the screw 12, which together with the nut 13, may be regarded as an operating device, the hook portion 11 will be moved to the right in FIG. 1 and engage the vehicle underneath the corner region 4 to be pulled obliquely upwardly to the right towards the foot 8, such that the hook portion 11 and the foot 8 are drawn and pressed towards each other, whereby the fixing device 7 is clamped about the longitudinal side edge portion of the vehicle roof.

The fixing device 7 is made up of two parallel legs 14 of which only one is shown in the figure. At their lower ends the legs 14 are connected by means of a joint 15 to the foot 8, so that this is pivotal in relation to the fixing device 7 about a longitudinal axis substantially parallel to the direction of travel of the vehicle. At the upper ends, the legs are interconnected by means of a supporting member 16 on which the loading member 6 rests and which takes up loads therefrom and transmits them through the two legs 14 to the foot 8 and the vehicle roof.

In the illustrated embodiment, the end portions of the loading member 6 are enclosed by a U-shaped member 17 having its upper surface (the bottom of the U) designed as a pressure member engaging the upper face of the loading member 6. The U-shaped member 17 has two side flanges 19 externally engaging the two legs 14 of the fixing device 7. The side flanges 19 of the U-shaped member 17 are connected to a transverse rod 20 which may suitably be designed as a rivet. The rivet 20 extends straight through elongated openings 21 in the two legs 14 of the fixing device 7 and, in between these legs, engages a cam member 22 having a cam surface 23 which engages the underside of the supporting member 16. The cam member 22 is pivotal about the rivet 20 and, when pivoting clockwise from the position shown in FIG. 1, produces a downwardly directed force on the rivet as the cam surface 23 is moving along the underside of the supporting member 16. As a result of this downwardly directed force and of the movement of the rivet 20, the U-shaped member 17 will also be called downwards and press against the loading member 6 which is clamped in the fixing device 7 between the pressure member 18 and the supporting member 16.

At its lower end, the cam member 22 has stops 24 which after a certain pivotal movement will engage edge portions of the legs 14. A further pivotment of the cam member 22 in the clockwise direction will thus be prevented.

As appears from the figure, the nut 13 is pivotally fixed in a cam member 22 about an axis 13' which is vertically offset relative to the longitudinal axis of the screw 12, which means that tightening of the screw 12 will bring about the above mentioned clock wise pivotal movement of the cam member 22 and the resulting clamping of the loading member 6 between the pressure member 18 and the supporting member 16. The tightening of the screw 12 further brings about the above-indicated pivotal movement of the hook portion 11 in underneath the corner region 4 and the resulting clamping of the fixing device about the longitudinal side edge portion of the vehicle roof. To this end, the second engagement member 10 further has at its upper end an engaging portion 25 abutting against a slide surface 26 on the cam member 22. By the engagement of the stops 24 against the legs 14, the cam member 22 will be correctly positioned relative to the fixing device and, hence, the slide surface 26 will also be correctly positioned in the fixing device, whereby an efficient clamping effect can be achieved between the second engagement member 10 and the foot 8 fixed in the fixing device 7.

In the illustrated embodiment, the geometry is such that upon initial tightening of the screw 12, the hook portion 11 will first be loosely applied against the corner region 4, where upon the cam member 22 is pivoted in the clockwise direction until the stops 24 prevents further pivotment. In this position, the loading member 6 is safely clamped in the fixing device 7 and not until this position will the clamping of the second engagement member 10 be effected. This means that the laterally directed force on the entire load carrier which might be produced by the second engagement member will not cause the load carrier in its entirely to be displaced sideways, even if the engagement between the foot and the roof is not quite perfect. The reason for this is that the load carrier is symmetric, such that a corresponding counter-directed force is produced at the other fixing device 7, and this force is transmitted by the loading member and its attachment in the two fixing devices.

The embodiment described above may easily be modified for use also on such vehicles as are equipped with the conventional roof molding or channel. In such a modified embodiment, the second engagement member 10 has been designed for engaging the car body underneath the roof molding itself. However, this embodiment has no pivotal foot 8. Instead, there extends from the two legs 14 obliquely downwardly to the left in FIG. 1 and substantially parallel to the second engagement member 10 a supporting foot which is designed to engage internally (at the upper side) in the roof molding or channel. This supporting foot suitably is mounted completely rigidly in the two legs or may alternatively be formed integrally therewith.

ALTERNATIVE EMBODIMENTS

Figure 2:
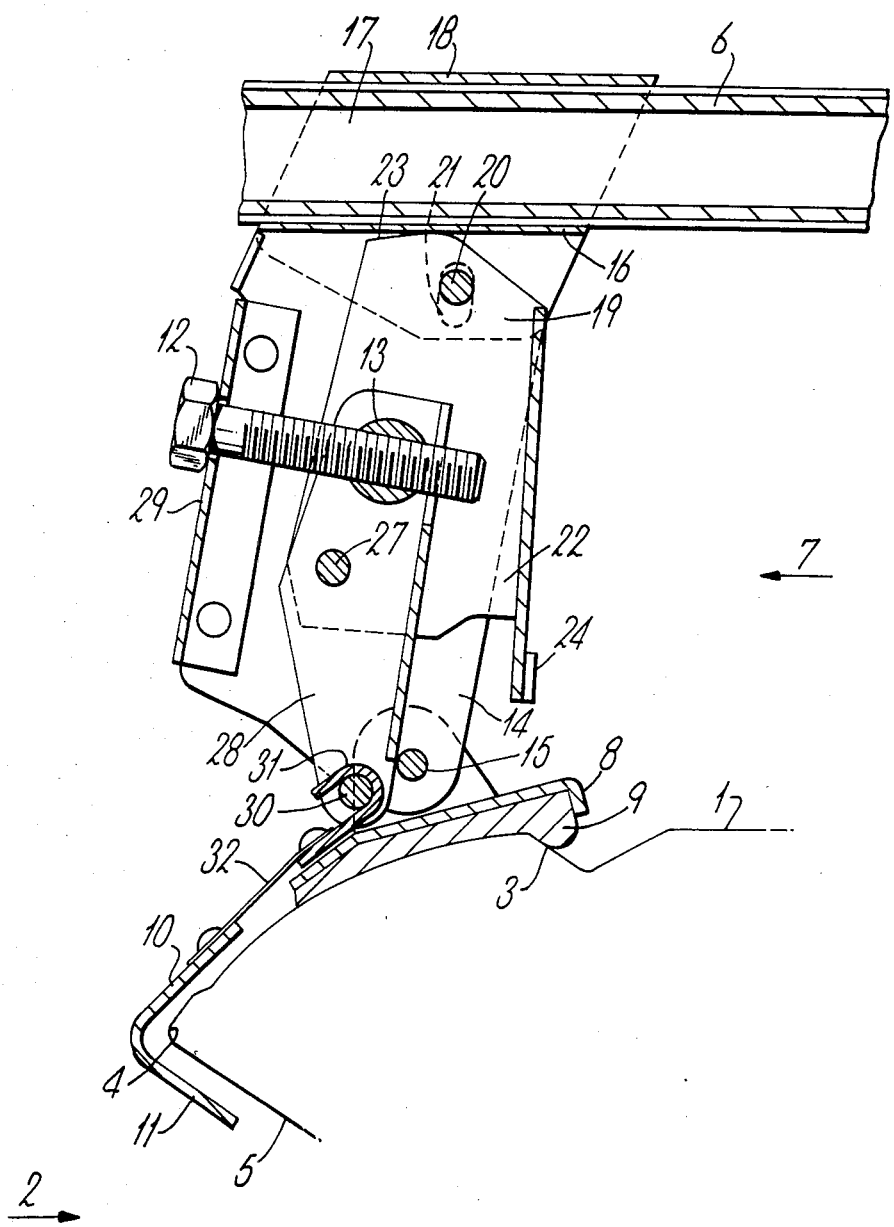
FIG. 2 in a view corresponding to FIG. 1, shows a modified embodiment of the invention.

In FIG. 2, there is shown a first modified embodiment. In this embodiment and also in the further alternative embodiments to be described below, identical components have been given the same reference numerals as in FIG. 1.

The embodiment in FIG. 2 thus comprises a loading member 6 which is enclosed by a U-shaped member 17 having a pressure member 18 disposed above the loading member, and side flanges 19 externally engaging the outer lateral surfaces of two legs 14 which are part of the fixing device 7 proper. Further, the U-shaped member 17 has a transverse rod or rivet 20 which, as described above, can operates with a cam member 22 having a cam surface 23. As described above, the cam surface 23 here also engages the under side of a supporting member 16 and the pressure member 18 is urged downwardly so as to press the loading member 6 into the correct position against the supporting member 16.

The fixing device 7, also as described above, is provided at its lower end with joints 15 for mounting a foot 8 with a resilient or medium hard exchangeable insert 9 to cooperate with the vehicle roof 1.

The most essential difference over the embodiment according to FIG. 1 is that a rocker 28 is pivotally mounted in a lower portion of the cam member 22 by means of a joint 27. At the upper end of the rocker 28, the nut 13 is pivotally mounted and cooperates with the screw 12 whose head engages the outer side of an abutment member 29 inter connecting the two legs 14.

At the lower end of the rocker 28, a transverse shaft 30 is rigidly mounted in the rocker between its two side legs. A curved portion 31 of the second engagement member 10 engages around the shaft 30. This means that the second engagement member 10 will have a very low mounting point in the fixing device 7, such that the second engagement member can also be used on such vehicles where the upper boundary surface 5 of the vehicle door opening 2 is heavily sloping and considerably deviates from a horizontal direction. In this embodiment, the second engagement member 10 suitably also has a flexible central portion 32.

This embodiment operates in the following manner. Upon initial tightening of the screw 12, the rocker 28 will first be pivoted anti clockwise until the hook portion 11 of the second engagement member 10 comes into engagement with the corner region 4. Further tightening of the screw 12 will then produce a clockwise pivotment of the cam member 22 since the rocker is connected thereto by means of the joint 27. This pivotal movement of the cam member in the clockwise direction brings about the above-indicated clamping of the loading member in the fixing device. Upon continued tightening of the screw 12, the rocker 28 will then be further pivoted anti clockwise, whereby to obtain safe clamping of the second engagement member against the corner region 4 and the upper boundery surface 5, such that the fixing device 7 is efficiently clamped about a longotudinal edge portion of the vehicle roof.

Figure 3:
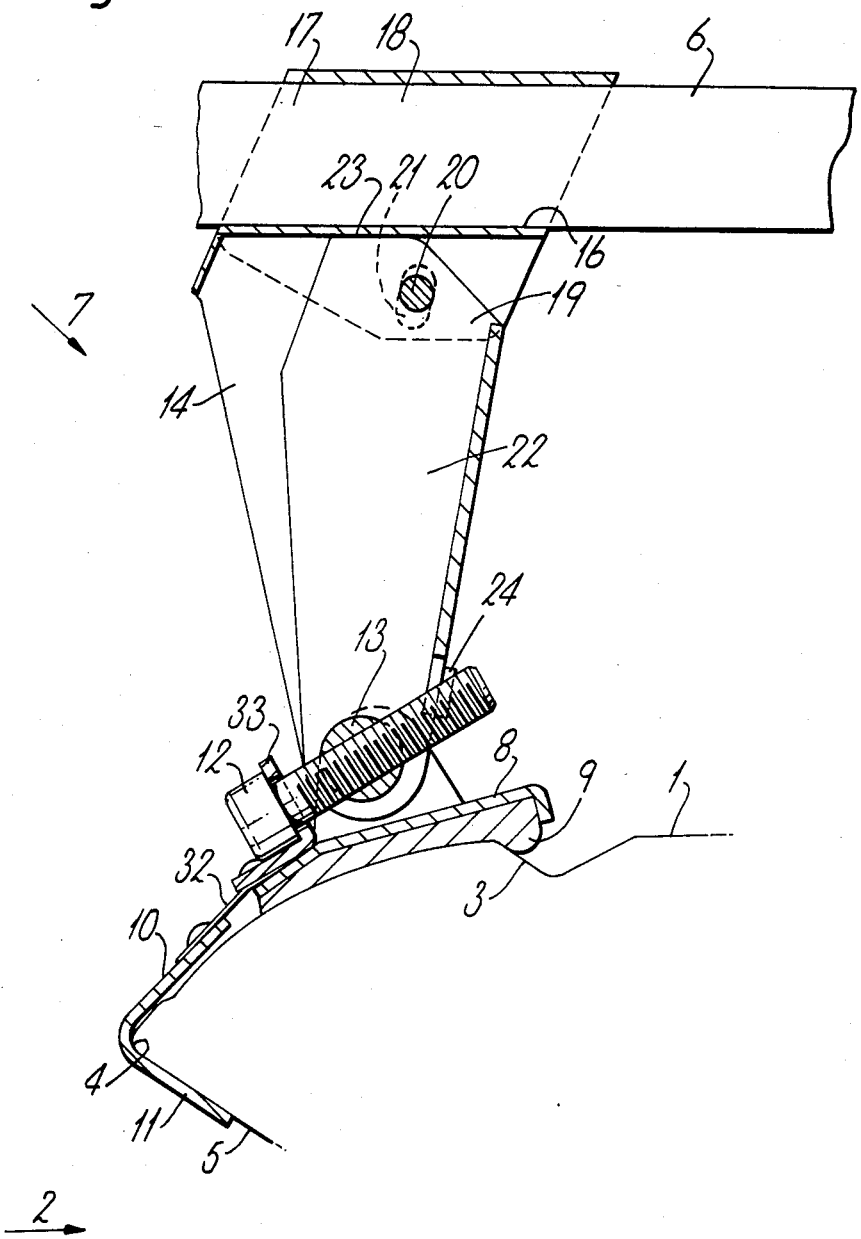
FIG. 3 in a view corresponding to FIG. 1 shows a third embodiment of the invention.

In FIG. 3, there is shown an alternative third embodiment of the invention. In this embodiment, the fixing device 7, in respect of the retention of the loading member 6, is of the same design as described with reference to FIGS. 1 and 2. This means that also in this embodiment use is made of a U-shaped member 17 which receives the loading member 6 and urges it into the correct position against a supporting member 16 inter connecting the two upper ends of the legs 14 of the fixing device. The pivotal mounting of the cam member 22 and the function of its cam surface 23 also agree with that described above.

In the embodiment according to FIG. 3, the cam member 22, as opposed to what has been described above, has the nut 13 pivotally mounted, while the head of the screw 12 screwed in the nut 13 engages an angled portion 33 of the second engagement member 10.

In the use of the embodiment according to FIG. 3, initial tightening of the screw 12 first causes the hook portion 11 to engage the corner region 4 and the upper boundary surface 5. Then follows a clockwise pivotal movement of the cam member 22 to the position shown in the drawing in which the stops 24 of the cam member engages the legs 14. In this position, the U-shaped member 13 is pulled down against the loading member 6, so that this is efficiently clamped between the pressure member 18 and the supporting member 16. Upon continued tightening of the screw 12, the second engagement member 10 will then be pulled into firm engagement against the corner region 4 and the upper boundary surface 5 along the upper edge of the vehicle door opening 2.

Figure 4:
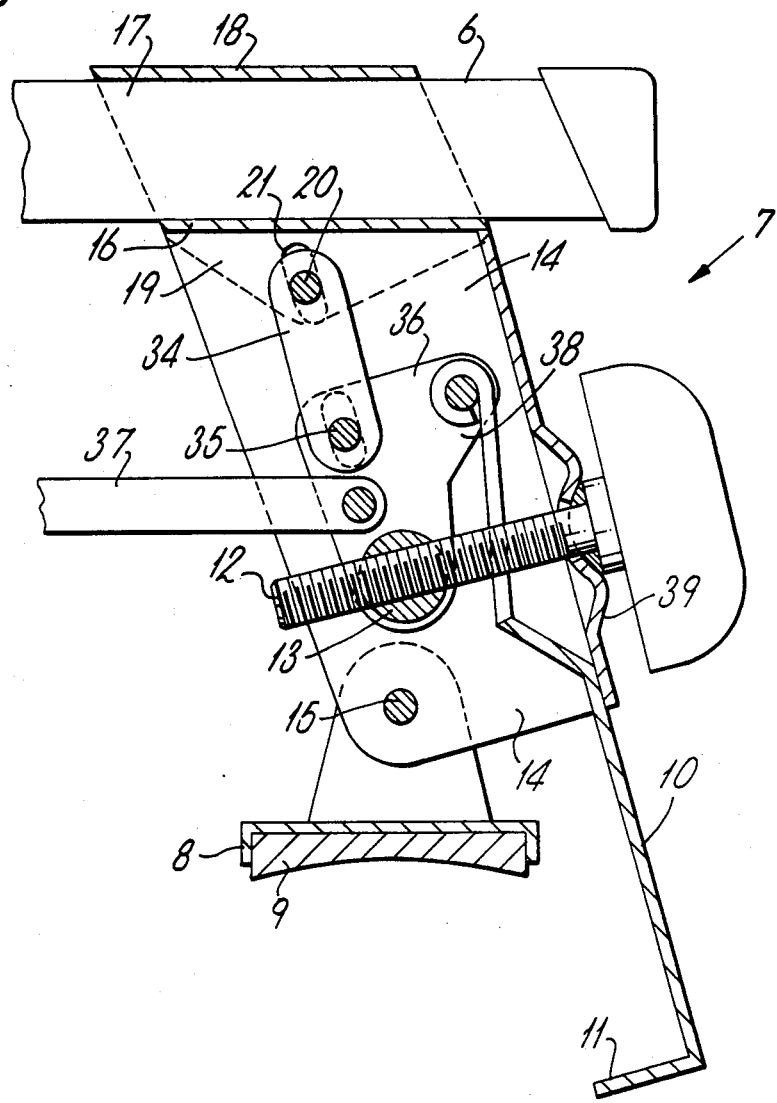
FIG. 4 in a view corresponding to FIG. 1, shows a forth embodiment of the invention.

In FIG. 4, there is shown an alternative fourth embodiment of the invention. Also in this embodiment, the same reference numerals are used for components corresponding to the components of the embodiment described above. Thus, the fixing devices 7 in this embodiment also have two legs 14 which at their upper ends are interconnected by means of a supporting member 16 engaging the loading member 6. In the same way as described above the loading member also cooperates with a U-shaped member 17 having a pressure member 18 for urging the loading member downwardly against the supporting member 16. Also, the U-shaped member 17 has a transverse rivet 20.

The lower ends of the legs 14 are connected by joint 15 to a foot 8 having an exchangable insert 9 adapted to the design of the vehicle roof. Further, the fixing device comprises a second engagement member 10 which at its lower end has a hook portion 11 for engaging the vehicle body.

As opposed to what has been described above, the embodiment according to FIG. 4 has a link member 34 provided at its upper end with an opening through which the transverse rivet 20 extends. The lower end of the link member 34 is connected by means of a joint 35 to a pivotal member 36 pivoltally connected to a pull rod 37 which suitably has adjustable length and which at its opposite end cooperates with a similar pivotal member 36 in a fixing device 7 at the opposite end of the loading member 6. At the lower end of the pivotal member 36, the nut 13 is pivotally mounted and cooperates with a screw 12. Further, the pivotal member 36 has an angular arm 38, which faces away from the pull rod 37 and in which the upper end of the second engagement member 10 is pivotally mounted. Finally, it should also be mentioned that the pivotal member 36 is not fixed directly in the fixing device 7 or the two legs 14 thereof.

The right-hand end of the screw 12 is FIG. 4 engages a lateral surface 39 which interconnects the two legs 14 of the fixing device 7.

The embodiment described in FIG. 4 is especially conceived for use in such cases where the vehicle roof has no marked shoulders or longitudinal strips 3 which may serve to correctly position the foot 8 and its insert 9 laterally (transversally of the direction of travel of the vehicle). In this embodiment, the laterally positioning function is instead ensured by the pull rod 37 which thus prevents the two fixing devices 7 from being moved away from each other in the longitudinal direction of the loading member 6.

Upon initial tightening of the screw 12, the pivotal member 36 will be pivoted substantially about the pivotal attachment of the pull rod 37 in the pivotal member, such that the second engagement member 10 is lifted. Then, the outer side of the engagement member 10 will engage the inner side of the lateral surface 39 of the fixing device, such that the second engagement member will be prevented from pivoting in an anti clockwise direction. When the lower hook portion 11 of the second engagement member 10 comes into engagement against the vehicle body, further tightening of the screw 12 will produce a displacement of the nut 13 to the right in the figure, such that the pull rod 37 is subjected to attractive effort in its longitudinal direction at the same time as the link member 34 pulls the rivet 20 downwardly and thereby produces clamping of the loading member 6 between the pressure member 18 of the U-shaped member 17 and the supporting member 16 on the two legs 14.

Figure 5:
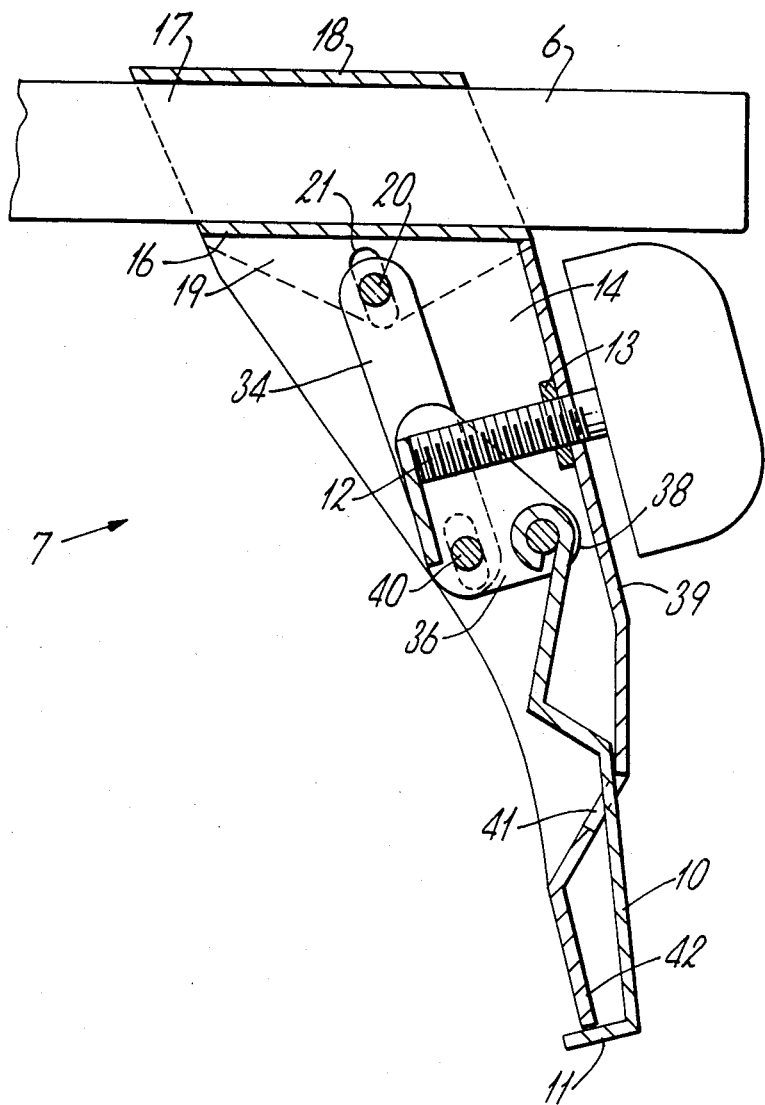
FIG. 5 in a view corresponding to FIG. 1, shows a fifth embodiment of the invention.

In FIG. 5, there is shown an alternative Fifth embodiment which is conceived for use in vehicles of the type having the conventional roof molding or channel.

Also in this embodiment, the upper end of each fixing device 7 and its cooperation with the loading member 6 is realised in the manner described above. Hence, these constructional details need not be further described here.

As appears from the drawing, there is mounted between the legs 14 of the fixing device 7 a pivotal member 36 which is vertically displaceable in relation to the legs 14 and which is pivotal about the shaft 40 pivotally mounted in the legs 14. The shaft 40 also cooperates with the lower end of a link member 34 which engages the transverse rivet 20.

The pivotal member 36 is of a substantially triangular shape and therefore has an angular arm 38, which extends outwards towards a lateral surface 39 interconnecting the two legs 14 of the fixing device 7. The angular arm 38 is hingedly connected to the upper end of the second engagement member 10 which extends through an opening 41 in the lateral surface 39 and engages the inner side thereof immediately over the opening.

As mentioned above, the embodiment according to FIG. 5 is intended for use on a vehicle having a conventional roof molding or channel. For this reason, there is no pivotal foot 8, the legs 14 instead having a lower foot member 42 which is adapted to engage internally (on the upper side) in the roof molding or channel.

In the use of the embodiment according to FIG. 5, initial tightening of the screw 12 will cause the angle member 36 to pivot in an anti clockwise direction about shaft 40. As a result, the second engagement member 10 will be lifted into lose engagement against the under side of the roof molding of the vehicle. A continued pivotment of the angle member 36 will thereafter exert a pulling force on the link member 34, such that the U-shaped member 17 is pulled downwards and its pressure member 18 urges the loading member 6 into the correct position against the supporting member 16 of the fixing device 7.

It is evident that the embodiment according to FIG. 5 can be modified by replacing the foot member 42 with the above mentioned pivotal foot 8.

Figure 6:
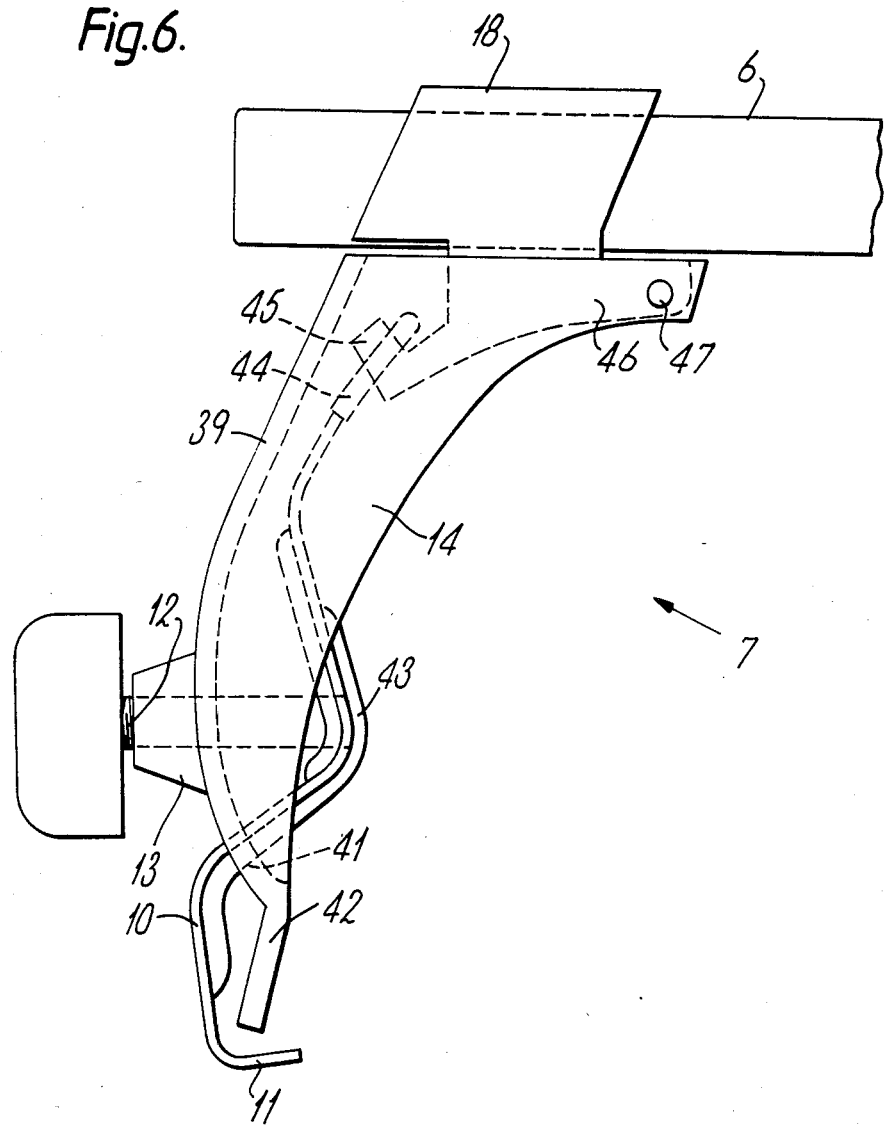
FIG. 6 in a view corresponding to FIG. 1, shows a sixth embodiment of the invention.

The alternative embodiment illustrated in FIG. 6 is intended for use on such vehicles as have a conventional roof molding or channel. For this reason, the fixing devices 7 at their lower ends have the above mentioned foot member 42 which is intended from above to engage internally in the roof molding. Further, the second engagement member 10 has a lower hook portion 11 which is intended to engage the car body at the under side of the roof molding, the second engagement member 10 extending as described above with reference to FIG. 5 through an opening 41 in the lateral surface 39 of the fixing device 7. In this embodiment, the nut 13 for the screw 12 is also disposed on the lateral surface 39 and the free end of the screw 12 engages a bent portion 43 of the second engagement member for urging this in a direction to the right in FIG. 6. The hook portion 11, on account of the bend of the second engagement member 10 and its cooperation with the opening 41, will thereby simultaneously move in a direction to the right and upwardly in FIG. 6.

In order to permit the movement pattern for the second engagement member 10 as indicated above, the upper end portion 44 of the engagement member must be prevented from pivoting in a clockwise direction, i.e. to the right in FIG. 6. To this end, the upper end portion abuts on a supporting member 45 of a rocker 46 which is pivotally mounted in the two legs 14 by means of a joint 47. The cooperation between the supporting member 45 and the upper end portion 44 further is such that the end portion can be displaced in its longitudinal direction in relation to the supporting member 45.

The rocker 46 is connected to a pressure member 18 which engages the upper side of the loading member 6 for urging it downwards against the fixing device 7 while cooperating therewith to obtain the correct position.

Upon initial tightening of the screw 12, the second engagement member 10 will first be displaced to the right and upwardly, while exerting a slight pressure against the supporting member 45 of the rocker 46. When the hook portion 11 thereafter comes into engagement against the under side of the roof molding or channel, continued tightening of the screw 12 will make the upper end portion 44 exert an increasing pressure against the supporting member 45 of the rocker 46, such that this is pivoted in an anti clockwise direction and its pressure member 18 exerts a pressure against the loading member 6 for obtaining the correct position thereof.

Figure 7:
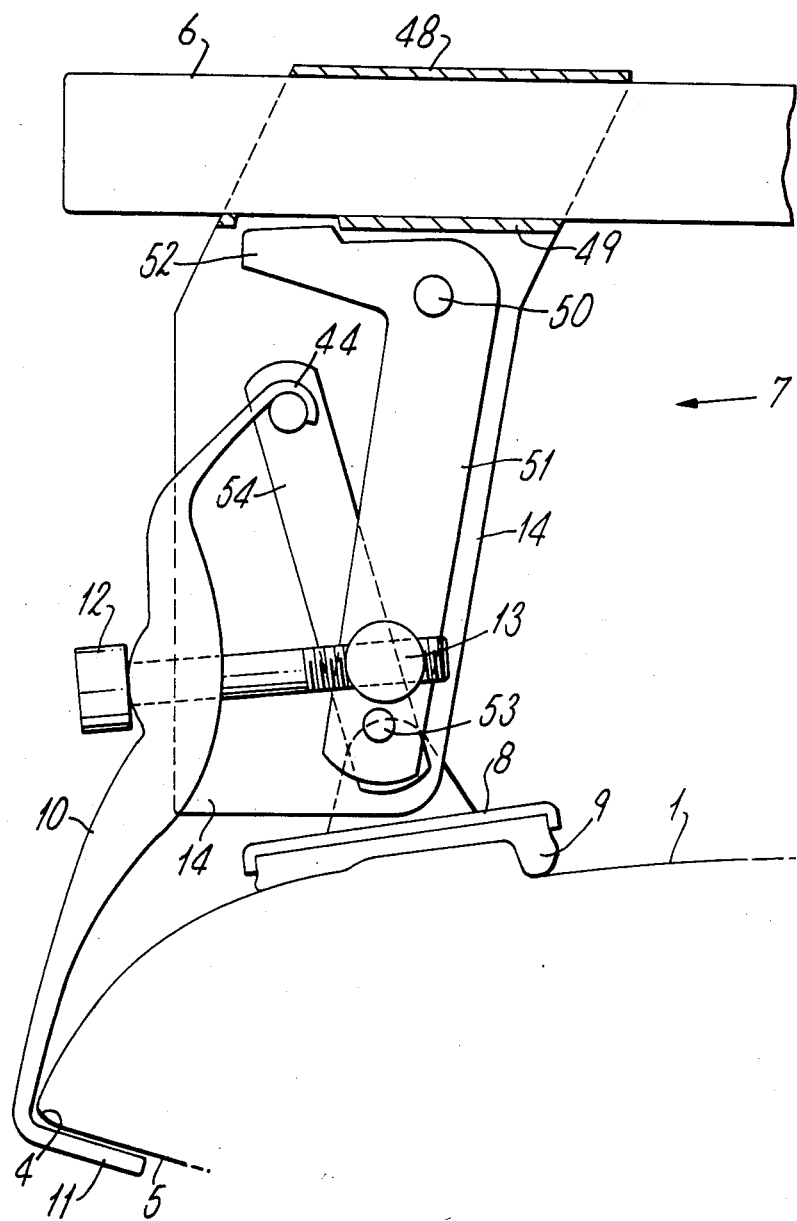
FIG. 7 in a view corresponding to FIG. 1, shows a seventh embodiment of the invention.

The embodiment using the rocker 46 and the supporting member 45 may of course also be used in the embodiment described above with reference to FIG. 1. In FIG. 7, there is shown yet another modified embodiment of the device according to the invention. In this embodiment, the lower ends of the fixing device, as described above, are provided with a pivotal foot 8 for cooperating with the vehicle roof.

The upper end of the fixing device 7 is designed with a sleeve which upwardly is defined by a supporting member 48 and downwardly has an engagement surface 49. In this manner, the two legs of the fixing device can be formed intergrally with the supporting member 48 and the engagement surface 49.

In between the two legs 14, an angle arm 51 is pivotally mounted in the fixing device 7 by means of a shaft 50. The angle arm 51 has a portion 52 which projects outwards towards the vehicle side and which can be moved up through an opening in the engagement surface 49 so as to urge the loading member 6 into the correct position against the supporting member 48. At the lower end of the angle arm 51, the screw 12 preferably is pivotally mounted. Further, an upwardly directed supporting arm 54 for the upper end of the second engagement member 10 is mounted by means of a joint 53.

In the use of the embodiment according to FIG. 7, the angled arm 51, after engagement of the hook portion 11 against the corner region 4, will be pivoted in a clockwise direction, at the same time as the upper end portion 44 of the second engagement member 10 bears on the supporting arm 54 and moves it in a pivotal clockwise movement. Upon continued tightening of the screw 12, the second engagement member 10 will thereby both be lifted and be moved to the right in FIG. 7, at the same time as the angle arm 51 is pivoted in a clockwise direction and is pressed against the loading member 6.

The embodiment according to FIG. 8 differs from the embodiment according to FIG. 7 only in that the angle arm 51 in its upper portion adjacent its pivot shaft 50 has a supporting surface 26 in analogy with what has been described above with reference to FIG. 1. Similarly, the upper end of the second engagement member 10 has an engaging portion 25 which has the same function as the engaging portion in FIG. 1.

The lower end of the angle arm 51 has a joint member 55 with the nut 13 cooperating with the screw 12 which extends through and engages the outer side or the second engagement member 10.

In the use of the embodiment according to FIG. 8 the second engagement member 10 will have the same movement pattern as that described with reference to FIG. 1. Further, the cooperation of the screw 12 with the joint member 55 and the lower end of the angle arm 51 will give rise to a clockwise pivotal movement of the latter, such that the laterally extending portion 52 is brought into the correct position of engagement against the loading member 6.

The embodiment according to FIG. 8 may also be further modified by replacing the pivotal foot 8 with a fixed foot for cooperating with a conventional vehicle roof molding or channel in substantially the same way as described above with reference to FIG. 5 or 6.

FIG. 9 finally illustrates another modified embodiment of the invention. In this embodiment, the loading member 6 is not in the form of closed profile but has a downwardly directed opening which in the schematically illustrated embodiment is laterally defined by two vertical flanges 56 directed towards the interior of the profile. If so desired, these flanges may of course be dispensed with and the loading member 6 may instead merely be provided in its under side with a longitudinal slot which need not extend throughout the entire length of the loading member.

In this embodiment, the fixing device 7 is provided, as described above, with a foot 8 which is pivotally mounted by means of a joint 15 and equipped with a medium hard or resilient, preferably exchangeable insert 9 for cooperating with the vehicle roof 1 and the longitudinal shoulder 3. Further, the second engagement member 10 in its lower end has a hook portion 11 for cooperating with the corner region 4 and the upwardly directed boundary surface 5.

The upper ends of the two legs 14 of the fixing device 7 are interconnected by a supporting member 16 as described above, for instance with reference to FIG. 1. Further, the legs 14 extend upwards beyond the supporting member 16 but need not extend as far as the upper side of the loading member 6. This is shown by dashed lines 57 in FIG. 9.

In between the two legs 14 of the fixing device 7, a rocker 59 is pivotally mounted on a shaft 58 which is located in a central portion of the rocker. To the right of the shaft 58, the rocker cooperates with a pull rod 60 extending through the supporting member 16 and into the loading member 6 where it has a head 61 engaging against the upper edges of the vertical flanges 56 or against the inner side of the bottom wall of the loading member in case these vertical parts are dispensed with. The pull rod 60 is movable in the vertical direction and can be drawn particularly in a downward direction upon a clockwise pivotal movement of the rocker about the shaft 58.

To the left (in FIG. 9) of the shaft 58, the rocker 59 further is connected to an upper curved portion 62 of the second engagement member having a central portion 63 engaging a shaft 64 preventing the hook portion 11 from being removed from the corner region 4.

The screw 12 also engages the rocker 59 and has a nut 13 fixed in the two legs 14, such that tightening of the screw 12 gives rise to a clockwise pivotal movement of the rocker 59 about the shaft 58 which is freely movable in the vertical direction in an elongated opening 65.

Initial tightening of the screw 12 will first cause the rocker to lift the second engagement member 10 into engagement against the corner region 4 and the upper boundary surface 5. When this lifting movement is thereafter prevented, the rocker will be pivoted in a clockwise direction, whereby the pull rod 60 with its head 61 will urge the loading member 6 into the correct position of engagement against the supporting member 16 on the fixing device 7.

The invention can be further modified within the spirit and scope of the accompanying claims.

I claim:

1. A device for carrying a load on a vehicle roof comprising: a load carrying member extending over the roof, fixing means having engagement means for detachably attaching the fixing means onto the vehicle, said fixing means including clamping means for clamping the load carrying member in the fixing means, an operating device arranged for fastening both the load carrying member to the fixing means and the fixing means onto the vehicle when operated, said fixing means including a pivotable member connected to said clamping means for moving said clamping means, when pivoted, to a position clamping said load carrying member to the fixing means, said pivotable member being connected to the operating device to be pivoted upon operation of the operating device, the fixing means including an abutment member, the clamping means including a pressure member which, by engaging the load carrying member, urges the load carrying member against the abutment member to clamp the load carrying member to the fixing means, said pressure member being operatively connected to the operating device to be actuated thereby, the contact between first and second surface portions of the load carrying member and corresponding abutting surfaces of the abutment member and the pressure member are substantially continuous over the area of contact between the pressure member and the abutment member surfaces.

2. A device as claimed in claim 2, wherein the abutment member is positioned underneath the load carrying member and the pressure member is a substantially U-shaped member which receives said load carrying member and has a pressure surface for engaging and urging the load carrying member downwardly into a clamping position against said abutment member.

3. A device as claimed in claim 2, wherein the substantially U-shaped member includes flange members extending to a position below the abutment member and connected to said pivotable member, a cam surface defined on said pivotable member and engageable with a side of the abutment member opposite from the load carrying member and pivotally displaceable towards and away from said side upon actuation of the operating device.

4. A device as claimed in claim 1, wherein the abutment member is a portion of the fixing means and is positioned above the load carrying member, the pressure member is a portion of the pivotable member mounted in the fixing means and upon actuation of the operating device, said pressure member urges the load carrying member against said abutment member.

5. A device as claimed in claim 3, wherein the engagement means comprises a foot member for engaging a substantially upwardly facing surface of the vehicle, a clamping member having a first end defining a clamping portion which is movable towards and away from said foot member for engagement with the vehicle, the operating device engaging said pivotable member and said clamping member for drawing said pivotable member and said clamping member towards each other, said clamping member having a second end portion engaging a slide surface of the pivotable member.

6. A device as claimed in claim 3, wherein said engagement means comprises a foot member for engaging a substantially upwardly facing surface of the vehicle, a clamping member having a first end defining a clamping portion which is movable towards and away from said foot member for engagement with the vehicle, a rocker arm pivotally connected with a central portion of the pivotable member, said rocker arm engaging with a first end portion of said clamping member and having a second end portion engaging with said operating device for pivotal movement of both the rocker arm and the pivotable member.

7. A device as claimed in claim 3, wherein said engagement means comprises a foot member for engaging a substantially upwardly facing surface of the vehicle, a clamping member having a first end defining a clamping portion which is movable towards and away from said foot member for engagement with the vehicle, said pivotable member having an arm projecting from a cam surface on said pivotable member and connected to said operating device and said clamping member.

8. The device as claimed in claim 1, wherein the operating device includes a threaded bolt and nut, said nut being fastened to the pivotable member, said nut being pivotal relative to the pivotable member about an axis that does not constantly intersect the longitudinal axis of the bolt.

9. The device as claimed in claim 1, wherein the operating member passes through the engagement means.

10. A device for carrying a load on a vehicle roof comprising: a load carrying member extending over the roof, fixing means having engagement means for detachably attaching the fixing means onto the vehicle, said fixing means including clamping means for clamping the load carrying member in the fixing means, an operating device arranged for fastening both the load carrying member to the fixing means and the fixing means onto the vehicle when operated, said fixing means including a pivotable member connected to said clamping means for moving said clamping means, when pivoted, to a position clamping said load carrying member to the fixing means, said pivotable member being connected to the operating device to be pivoted upon operation of the operating device, the fixing means including an abutment member, the clamping means including a pressure member which, by engaging the load carrying member, urges the load carrying member against the abutment member to clamp the load carrying member to the fixing means, said pressure member being operatively connected to the operating device to be acutated thereby, the operating device includes a threaded bolt and nut, said nut being fastened to the pivotable member, said nut being pivotal relative to the pivotable member about an axis that does not constantly intersect the longitudinal axis of the bolt.

11. The device of claim 10, wherein the operating member passes through the engagement means.

12. The device as claimed in claim 10, wherein the operating device is movable with the engagement means.

13. The device as claim in claim 10, wherein the operating device is movable in a direction different from its longitudinal axial direction upon movement of the engagement means.

14. The device as claimed in claim 10, wherein the axis of the bolt is located between the axis of the nut and a cam surface provided on the pivotable member for actuating the pressure surface.

15. A device for carrying a load on a vehicle roof comprising: fixing means having engagement means for detachably attaching the fixing means onto the vehicle, said fixing means including clamping means for clamping the load carrying member in the fixing means, an operating device arranged for fastening both the load carrying member to the fixing means and the fixing means onto the vehicle when operated, said fixing means including a pivotable member connected to said clamping means for moving said clamping means, when pivoted, to a position clamping said load carrying member to the fixing means, said pivotable member being connected to the operating device to be pivoted upon operation of the operating device, the fixing meand including an abutment member, the clamping means including a pressure member which, by engaging the load carrying member, urges the load carrying member against the abutment member to clamp the load carrying member to the fixing means, said pressure member being operatively connected to the operating device to be actuated thereby, the operating member passing through the engagement means.

16. A device as claimed in claim 15, wherein the abutment member is positioned underneath the load carrying member and the pressure member is a substantially U-shaped member which receives said load carrying member and has a pressure surface for engaging and urging the load carrying member downwardly into a clamping position against said abutment member.

17. A device as claimed in claim 16, wherein the substantially U-shaped member includes flange members extending to a position below the abutment member and connected to said pivotable member, a cam surface defined on said pivotable member and engageable with a side of the supporting abutment member opposite from the load carrying member and pivotally displaceable towards and away from said side upon actuation of the operating device.

18. A device as claimed in claim 15, wherein the abutment member is a portion of the fixing means and is positioned above the load carrying member, the pressure member is a portion of the pivotable member mounted in the fixing means and upon actuation of the operating device said pressure member urges the load carrying member against said abutment member.

19. A device as claimed in claim 17, wherein the engagement means comprises a foot member for engaging a substantially upwardly facing surface of the vehicle, a clamping member having a first end defining a clamping portion which is movable towards and away from said foot member for engagement with the vehicle, the operating device engaging said pivotable member and said clamping member for drawing said pivotable member and said clamping member towards each other, said clamping member having a second end portion engaging a slide surface of the pivotable member.

20. A device as claimed in claim 17, wherein said engagement means comprises a foot member for engaging a substantially upwardly facing surface of the vehicle, a clamping member having a first end defining a clamping portion which is movable towards and away from said foot member for engagement with the vehicle, a rocker arm pivotally connected with a central portion of the pivotable member, said rocker arm engaging with a first end portion of said clamping member and having a second end portion engaging with said operating device for pivotal movement of both the rocker arm and the pivotable member.

21. A device a sclaimed in claim 17, wherein said engagement means comprises a foot member for engaging a substantially upwardly facing surface of the vehicle, a clamping member having a first end defining a clamping portion which is movable towards and away from said foot member for engagement with the vehicle, said pivotable member having an arm projecting from a cam surface on said pivotable member and connected to said operating device and said clamping member.

22. The device as claimed in claim 15, wherein the operating device includes a threaded bolt and nut, said nut being fastened to the pivotable member, said nut being pivotal relative to the pivotable member about an axis that does not constantly intersect the longitudinal axis of the bolt.

23. The device as claimed in claim 15, wherein the operating device is movable with the engagement means.

* * * * *